United States Patent [19]
Rothmann et al.

[11] 3,856,641
[45] Dec. 24, 1974

[54] METHOD OF OBTAINING VANADIC OR TUNGSTIC OR MOLYBDIC HYDROXIDE

[75] Inventors: Hans Rothmann; Werner Keil, both of Nurnberg, Germany

[73] Assignee: Gesellschaft Fur Elektrometallurgie m.b.H., Dusseldorf, Germany

[22] Filed: Sept. 18, 1972

[21] Appl. No.: 289,967

[30] Foreign Application Priority Data
June 9, 1972 Germany.............................. 2228065

[52] U.S. Cl. .................................................. 204/96
[51] Int. Cl............................................ C01b 13/14
[58] Field of Search ....................................... 204/96

[56] References Cited
UNITED STATES PATENTS
2,606,148 8/1952 Portanova et al...................... 204/96
3,347,761 10/1967 Bicek................................... 204/96

*Primary Examiner*—R. L. Andrews
*Attorney, Agent, or Firm*—Cushman, Darby & Cushman

[57] ABSTRACT

Processes for obtaining vanadic, tungstic or molybdic hydroxides by precipitation in aqueous colutions of their alkali salts impose difficulties in disposal of alkali metal salts. Such difficulties are obviated according to the invention by an electrolytic process using conventional three-chambered electrolytic cell, with controlled abstraction of alkali metal ions in the centre chamber thereof in terms of isoelectric point, with simultaneous recovery of the therein contained heavy metal hydroxides in the center chamber and alkali hydroxide from the cathode chamber.

8 Claims, 1 Drawing Figure

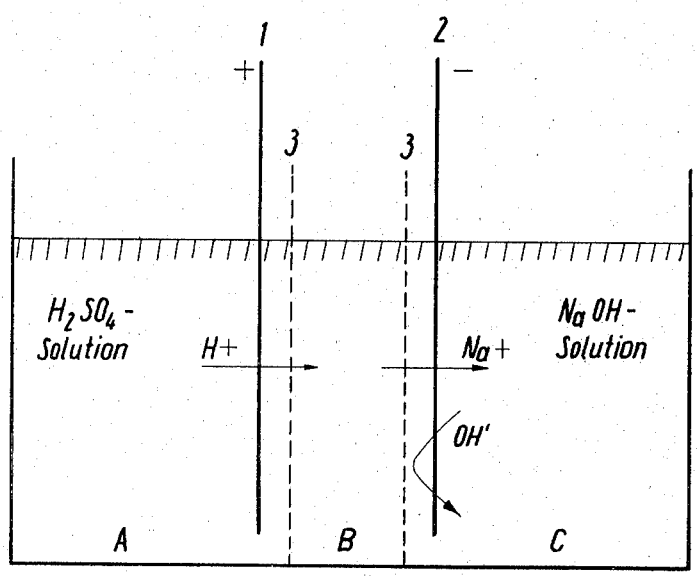

METHOD OF OBTAINING VANADIC OR TUNGSTIC OR MOLYBDIC HYDROXIDE

This invention relates to a method of obtaining vanadic or tungstic or molybdic hydroxide from aqueous solutions of alkali salts with the simultaneous recovery of the alkali hydroxides with the aid of an electric current.

The method of obtaining the hydrated oxides of vanadium, tungsten and molybdenum generally used consists in first roasting the raw materials with soda and then leaching the roasted material with water. This applies particularly to the processing of vanadium ores. Impure molybdenum oxides are directly dissolved in caustic soda, whereas tungsten ores are treated with caustic soda, for instance under pressure, to produce the water-soluble sodium compounds.

From such alkali/heavy metal salt solutions the hydroxides are precipitated with mineral acids. The isoelectric point must be carefully observed to ensure quantitative precipitation, the isoelectric point being the pH at which the colloidal oxide sol loses its electric charge and coagulates so that it is filtrable. For the different hydroxides this osoelectric point is at different pH values, for vanadic hydroxide it is 2.2, for tungstic hydroxide it is 1.5 and for molybdic hydroxide it is 1.0.

By way of example, in the precipitation of vanadic hydroxide the reactions occurring when a sodium vanadate solution is treated with a mineral acid are as follows:

| | | | | | |
|---|---|---|---|---|---|
| $2[VO_4]$ | $+ 2H \rightleftharpoons [V_2O_7]$ | $+ H_2O$ | (pH of from 12 to 10.6) | (1) |
| $2[V_2O_7]$ | $+ 4H \rightleftharpoons H_2[V_4O_{13}]$ | $+ H_2O$ | (pH of from 9.0 to 8.9) | (2) |
| $2H_2[V_4O_{13}]$ | $+ 8H \rightleftharpoons 4H_4[V_5O_{16}]$ | $+ H_2O$ | (pH of from 7.0 to 6.8) | (3) |
| $2H_2[V_5O_{16}]$ | $+ 6H \rightleftharpoons 5[V_2O_5]$ | $+7H_2O$ | (pH of 2.2) | (4) |
| $[V_2O_5]$ | $+ 2H \rightleftharpoons 2[VO_2]$ | $+ H_2O$ | (pH of 1) | (5) |

In conventional extraction processes an excess of alkali is generally added to achieve as high as possible a solubility of the valuable elements in the raw materials in water. In the subsequent precipitation of the heavy metal hydroxides by mineral acids, alkali salts are formed which are not required. This is a matter of particular importance for keeping the water pure to avoid environmental pollution. If for example sulphuric acid is used, then the effluent will be a dilute solution of sodium sulphate from which the sodium sulphate can be removed only by carrying out a complicated and uneconomical process of evaporation and crystallisation. However according to the size of the production plant the quantities of sodium sulphate may be too large for a ready market sale.

A similar situation applies to the use of hydrochloric acid for precipitation. Large quantities of common salt are difficult to dispose of in the impure form in which they are obtained unless they first undergo an additional process of purification.

It is the object of the present invention to avoid the substantial disadvantages inherent in conventional methods of precipitating the hydroxides with mineral acids and instead to recover the vanadic, tungstic or molybdic hydroxides from the aqueous alkali salt solutions with the simultaneous recovery of the alkali hydroxides by electrolysis.

It is known that vanadic hydroxide can be precipitated from sodium vanadate solutions by means of an electric current. However, the solutions must not contain either chloride or sulphate ions. If a clay cell is used as a diaphragm, vanadic pentoxide and iron vanadate are deposited at the anode. However this method has never been carried out on a major scale for the production of vanadic hydroxide due to technical difficulties which are difficult to overcome.

Electrolytic processes have also been proposed in which alkali chromate solutions are separated with the aid of diaphragms into alkali dichromate and caustic soda, wherein conventional two-chamber cells with diaphragm for separating the cathode from the anode are used. Electrolysis cannot be continued beyond the sodium dichromate stage because the expenditure of electric current substantially increases as the alkali content diminishes. Another disadvantage of this electrolysis is that the anode is in contact with a highly corrosive sodium chromate/dichromate solution with a resultant considerable loss of anode material.

The present invention solves the problems by using an electric current to abstract alkali ions from the aqueous alkali/heavy metal salt solution in the centre chamber of a conventional three-chamber electrolytic cell, separated by cation exchanger diaphrams from the anode and cathode chambers. This process is continued until the isoelectric point is reached, when the vanadic or tungstic or molybdic hydroxides are precipitated whereby they can be recovered. In the cathode chamber the alkali hydroxide accumulates and can thus also be recovered.

The accompanying drawing schematically illustrates such a three-chamber electrolytic cell, which as such is known in the art. The cell consists of a cathode chamber C and an anode chamber A. Between them is a so-called centre chamber B divided from the anode and cathode chambers by ion exchanger diaphragms 3.

Such three-chamber electrolytic cells containing ion exchanger diaphragms are used for the demineralisation of water. Their use for the purpose of abstracting alkali from alkali-containing solutions according to the invention has not been previously proposed.

If such a cell is used for the purpose according to the invention the anolyte will be a dilute sulphuric acid and the anode I will be lead. The catolyte is an alkali hydroxide solution and the cathode 2 is of steel plate. If the centre chamber is now filled with the alkali/heavy metal salt solution and the current switched on, hydrogen ions will migrate from the anode chamber through the cation exchanger diaphragm into the centre chamber from where alkali ions will migrate at the same rate through the other exchanger disphragm into the cathode chamber where they lose their charges and form alkali hydroxide.

The exchanger diaphragms are permeable only to cations. Hence the hydroxyl ions are prevented from migrating from the cathode to the anode in the same way as the corresponding anions of the isopolyvenadic or isopolymolybdic or isopolytungstic acid are held back. Consequently the content of alkali ions in the centre chamber of the cell will gradually diminish. The anions remain in the centre chamber and because of the rise in the hydrogen ion concentration they will form isopolyacids of the heavy metals.

As the electrolytic process continues, the solution in the centre chamber becomes increasingly acid. When the isoelectric point has been reached the heavy metal hydroxides precipitate. By performing this electrolysis in which the alkali/heavy metal salt solution is in the centre chamber 5 the hydrated oxides precipitate practically quantitatively and after filtration they can be further processed.

If the centre chamber B is provided with an inlet and an outlet and the alkali/metal salt solution is passed at the appropriate rate through the centre chambers of one or more serially co-operating cells in succession, alkali ions can continuously be abstracted from the alkali salt solution and accumulated in the cathode chambers as alkali hydroxide solutions, which can also be reused. In practice this removal of alkali ions constitutes a substantial saving in mineral acid needed for precipitating the hydrated oxides of the heavy metals and hence a reduction in the quantity of neutralising salts in the precipitated solutions.

Alternatively the electrolysis can be performed in several stages in such manner that the process is first continued to the neutral point, any precipitated impurities being filtered off and electrolysis then continued in the purified solution until the desired pH has been reached.

A further procedure comprises adjusting the pH with the aid of the electric current to a point closely preceding the isoelectric point to avoid producing an excess of the hydrated oxide mud, and then exactly adjusting to the isoelectric point outside the cell system with the aid of the mineral acid.

The alkali hydroxide forming in the catolyte is very pure. It may be concentrated to a 2 to 5 N, preferably a 3 N solution. By continuously withdrawing the catolyte and at the same time replacing the catolyte volume with water, an alkali hydroxide solution of constant concentration can be obtained which can be recycled to the process for extracting the raw materials. Alternatively by passing in carbon dioxide, sodium carbonate can be precipitated and likewise returned into the extraction process.

By electrolysing as proposed by the present invention, from 50% to 90%, preferably 70%, of the alkali can be abstracted in an economically efficient manner from alkali-containing heavy metal salt solutions, depending on the composition of the starting solution. This means that the content of neutral salts in the effluents which could not be avoided in conventional processes can be substantially minimised. Another advantage is that the alkali hydroxide solution contains no extraneous ions which may accumulate and thus prevent the alkali from being recycled.

The following non-limiting Examples of the invention are provided:

EXAMPLE 1

A technical sodium vanadate solution containing a small proportion of sodium chloride and consisting of 34.9 g/litres of vanadium and 40 g/l of sodium, and having a pH of 9.7, was introduced into a three-chambered electrolytic cell in which the anode and cathode chamber capacities were 800 ml each and the centre chamber had a capacity of 250 ml and was separated from the anode and cathode chambers by two cation exchanger diaphragms. The anolyte was a 6% sulphuric acid solution. The lead anode had a surface area of 1 $dm^2$. 800 ml of a 1N caustic soda solution were introduced into the cathode chamber. The surface area of the steel cathode was 1 $dm^2$. 250 ml of the sodium vanadate solution were introduced into the centre chamber.

The electrolysis was effected with a 10 amp. current at a voltage of 6.1 volts at 60° to 70°C. After 55 minutes the sodium vanadate solution had a pH of 2.0, whereas the concentration of the caustic soda solution in the cathode chamber was 1.38N. The current yield related to the formation of sodium hydroxide was 90%. The vanadic hydroxide suspension was drained from the centre chamber, brought to the boil to complete the precipitation of the hydrated oxide and then filtered. The filtrate contained 0.26 g/l of vanadium and 12 g/l of sodium, corresponding to a 70% abstraction of sodium ions.

EXAMPLE 2

The centre chamber in the cell described in Example 1 was provided with an inlet and an outlet. The sodium vanadate solution had the same concentration as in Example 1. Two litres of this solution were continuously pumped into the centre chamber from a storage vessel at the rate of 1.2 l/hour and then continuously returned to the vessel. After 450 minutes the vanadate solution had a pH of 2 whereas the concentration of the caustic soda in the cathode chamber was 3.97N. The caustic soda concentration had thus increased to 95.5 g NaOH and the current yield related to NaOH was 85%. The vanadic hydroxide suspension obtained was brought to the boil outside the cell system for the purpose of completing the precipitation of the vanadic hydroxide, the precipitated hydroxide then being filtered off. The filtrate contained 12.5 g/l of sodium, corresponding to an abstraction of sodium of 69% and of 0.19% vanadium.

EXAMPLE 3

The same sodium vanadate solution as that used in Examples 1 and 2 was recylced, as in Example 2, through the centre chamber at the rate of ½ l/hour, and electrolysed. As soon as the pH reached 3.0 the solution from which no vanadic hydroxide had as yet precipitated was heated to 95°C. outside the cell and at this temperature the pH was adjusted to 2.2 with 6.25 ml of conc. sulphuric acid to effect a complete precipitation. After filtration of the vanadic hydroxide the filtrate contained 0.2 g/l of vanadium and 18 g/l of sodium, this being equivalent to an alkali withdrawal of 55% and an 86% current yield.

EXAMPLE 4

750 ml of sodium molybdate solution containing 42 g/l of molybdenum, 50 g/l of sodium (pH of 10) were recycled at the rate of 1.1 l/h at 5.9 volts and 10 amps through the same three-chambered cell as that described in Examples 2 and 3, and electrolysed. After four hours the pH of the sodium molybdate solution was 1.5, the sodium hydroxide concentration in the cathode chamber had increased from 1N to 2.56N. The molybdenum solution was then adjusted to pH 1.0 with nitric acid outside the cell and brought to the boil for the purpose of effecting complete precipitation. After filtration of the molybdic hydroxide the filtrate contained 11.4 g/l of sodium and 2.6 g/l of molybdenum, equivalent to a sodium ion recovery of 77% and an 83% current yield.

What is claimed is:

1. A method of producing vanadic, tungstic or molybdic hydroxide from aqueous alkali salt solutions containing vanadium, tungsten or molybdenum ions with the simultaneous recovery of alkali hydroxide by applying electric current between an anode and a cathode; comprising abstracting alkali metal ions by the electric current from the said solution until the isoelectric point is reached in the center chamber of a three-chambered electrolytic cell in which the center chamber is separated from the anode and cathode chambers by cation exchaanger diaphragms, the anolyte containing a mineral acid, the center chamber containing a heavy metal-alkali salt solution, and the catholyte containing an alkali metal hydroxide whereby vanadic, tungstic or molybdic hydroxide is precipitated, and recovering the said vanadic, tungstic or molybdic hydroxide, and recovering alkali hydroxide from the said cathode chamber.

2. A method according to claim 1, in which alkali ions are abstracted from the said solution in the centre chamber of one or in the centre chambers of a plurality of serially operated three-chambered electrolytic cells until the isoelectric point has been reached and concentrated in the cathode chamber, whereas the hydrated oxide suspension contained in the centre chamber is caused to flocoulate completely outside the electrolysing system.

3. A method according to claim 1, in which alkali ions are continuously abstracted from a flowing aqueous alkali/heavy metal salt solution in one or more centre chambers of an electrolytic cell system until the isoelectric point has been reached, and concentrated in the cathode chamber, and the suspension of hydrated oxide is withdrawn at the same rate from the centre chambers of the cell system and caused to precipitate completely outside the system.

4. A method according to claim 1, in which from 50% to 90% of the alkali ions, based on the total alkali content of the solution, are abstracted from the said solution, and the isoelectric point of the solution is adjusted outside the cell with a mineral acid whereby the hydrated oxides are precipitated.

5. A method according to claim 1, in which alkali hydroxide solution which concentrates in the cathode chamber is continuously withdrawn at a concentration of 2 to 5N, and replaced by water.

6. A method of producing heavy metal hydroxides of heavy metals selected from the group consisting of vanadium, tungsten or molybdenum from aqueous alkali salt solutions containing ions of said heavy metals with the simultaneous recovery of alkali hydroxide with the aid of an electric current, said method comprising passing an electric current between an anode and a cathode through a three-chambered electrolytic cell having an anode chamber, a center chamber and a cathode chamber, said center chamber separated from the anode chamber and the cathode chamber by cation exchanger diaphragms, the center chamber containing the aqueous heavy metal alkali salt solution, the anolyte being a mineral acid, and the catholyte being an alkali hydroxide, and abstracting alkali metal ions from the center chamber until the isoelectric point is reached in the center chamber to precipitate heavy metal hydroxide, recovering the precipitated heavy metal hydroxide, and recovering alkali hydroxide from the cathode chamber.

7. Method according to claim 6, wherein the anolyte is selected from the group consisting of sulfuric acid, and hydrochloric acid.

8. Method according to claim 7, wherein the anolyte is sulfuric acid.

* * * * *